W. W. Willis,
Stump Elevator.
Nº 12,496.   Patented Mar. 6, 1855.
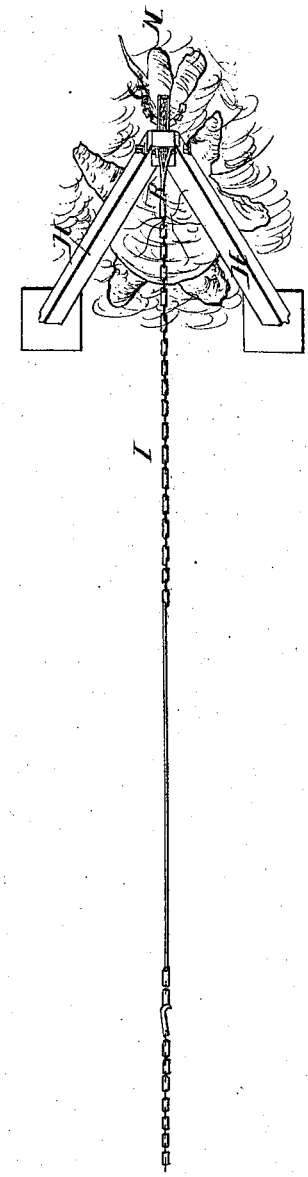
Fig. 4.
Fig. 6.
Fig. 5.
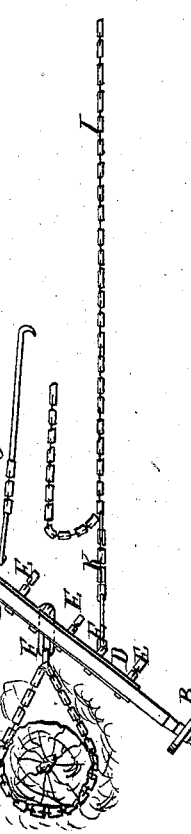
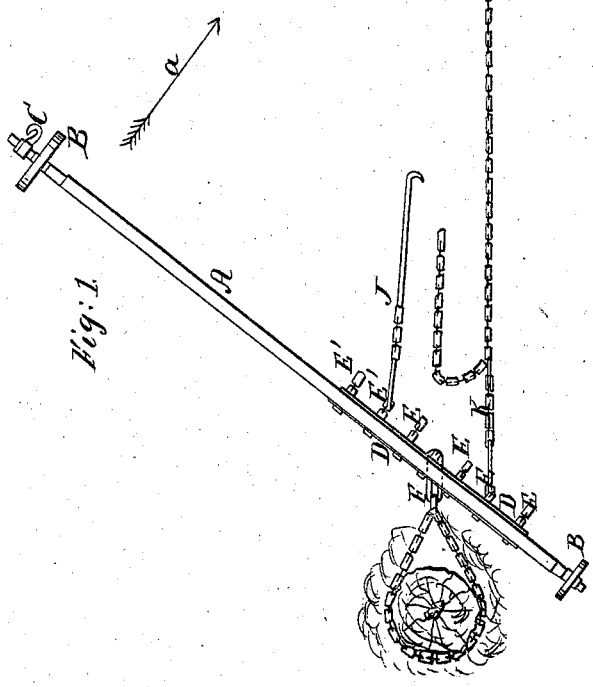
Fig. 1.

UNITED STATES PATENT OFFICE.

W. W. WILLIS, OF ORANGE, MASSACHUSETTS.

MODE OF EXTRACTING STUMPS.

Specification of Letters Patent No. 12,496, dated March 6, 1855.

*To all whom it may concern:*

Be it known that I, WILLIAM W. WILLIS, of Orange, in the county of Franklin and State of Massachusetts, have invented a new and useful Improvement in Apparatus for Extracting Stumps, of which the following is a full, clear, and exact description, reference being had to the accompanying drawings, which make part of this specification and in which—

Figure 1 represents a plan of the apparatus anchored to one stump, and commencing to extract another; Fig. 2 represents a side elevation of the machine the position of the parts being the same as in Fig. 1; Fig. 3 represents a side elevation of the machine with the stump raised on one side by the shears, and being drawn out with the aid of the tackle after the shears have ceased to operate efficiently as a toggle lever; Fig. 4 represents the hook in front of the shears which limits the action of the draft chain to the shears, and prevents it from acting upon the pulley blocks and tackle until after the shears have performed their office as a toggle lever; Fig. 5, represents a view of the guard hook on the rear of the shears to prevent the latter from falling down when the front hook is detached from the chain, and also to prevent the tackle from suddenly slacking, and allowing the stump to return to the hole; and Fig. 6 represents an end view of the claws of the check or guard hook.

In the accompanying drawings A represents a lever mounted upon wheels (B), and from ten to fifty feet in length according to the power to be exerted, and the strength of the team by which it is operated. For drawing small stumps, a lever of ten feet in length, and a heavy yoke of oxen would be sufficient, while the largest stumps will require a longer lever or a stronger team. If the team is not increased the length of the lever must be, as there are certain limits within which it will not answer to shorten the purchase on account of the amount of slack necessary for hooking and unhooking the chain or links, through which the purchase is applied to the stump in a manner hereafter to be described.

On the outer or small end of the lever, a hook (C) is placed for the team to be harnessed to. The inner end of this lever is strengthened by means of bars of iron (D); and a row of hooks (E) are secured to the lever so as to project at one side, while a link (F) in the middle of this row projects at the other side. This link is the fulcrum on which the lever is made to turn; and a cable chain (G) or other strong fastening connects this link with a stump, tree, stake, grapple, or other object that will operate as an anchor and sustain the pull by which the stump to be extracted is drawn out of the ground. If the force was applied in precisely the same way to an anchor stump and to the one it was designed to withdraw the latter would only be removed in case it was less firmly rooted in the ground than the other; but the force is not applied in the same way to both the stumps. The cable (G) as shown in the drawings is simply tied around the anchor stump low down, while there is a pair of shears (H) standing over the stump to be drawn, to which the draft chain is connected in such manner that the pull upon the stump to be extracted is upward, and toward the anchor stump, and while it is moved very slowly, the sum of the forces tending to withdraw it from the ground, is at least ten times that which the anchor stump has to resist.

The draft chain (I) is connected to the links (E) of the lever (A) alternately on opposite sides of the fulcrum link (F) as shown in Fig. 1; and when the lever has been turned in the direction of the arrow (a) until it is almost parallel with the draft chain (I) the link (E') is connected with the chain, by means of the link rod (J), when the motion of the lever is reversed and the draft chain is taken up a distance nearly equal to the distance which the links (J and K) are separated, less the slack which is necessary in order to hook the links. By repeating these movements of the lever, and taking up the chain, the stump will be drawn out.

The draft chain is connected, as has been shown, by one end to the links (J and K) of the lever (A); and its opposite end after passing over a pulley (L) in the head (M) of a pair of shears (H) passes through a block (N) and is connected to a link (P) below the head of the shears. The shears are placed over the stump with their feet a little beyond the side of the stump in the direction in which it is to be overturned, while the top of the shears overhangs the opposite side of the stump, its legs being inclined at an angle of about 45°. The hook on the lower side of the block (N) is now connected to one of the main roots of the stump by a chain (Q) and the hook (R) engaged with the draft chain (I) in front of the shears, while the check or guard hook (S) is engaged with the chain in the rear, the slack of the chains being taken up before the hooks are applied. The lever is now put into operation, when the taking up of the chain will raise the shears as shown in Fig. 2, lifting the stump with them. When the shears have been turned over toward the lever, until they occupy the position shown in Fig. 3, they cease to act with any advantage upon the stump and as a heavy pull is still required in order to complete the extraction, it is usual to prop up the stump, slacken the chain, take a new purchase with the shears, and repeat the operation thus described. This causes a great deal of hard labor, and occupies much time, to save both of which, I have contrived the hook (R) which when the shears have reached the point shown in Fig. 3, I detach and turn back as shown in the drawing, when the tackle comes into play giving a sufficient increase of force to complete the pulling up of the stump, without stopping to unhitch and take a new purchase. In this way the operation of extracting large stumps is greatly facilitated, and the labor and expense diminished.

The hook (R) is made of iron, very strong, and jointed to the head of the shears which should also be made of metal and very strong in order to sustain the pressure to which it is exposed, and to support the pulley (L) and hooks (R S). The guard hook (S) should also be made in the form represented and be very strong.

The chains of the draft hook (R) are of such construction, that when they are engaged with the draft chain, the latter cannot move between them either backward or forward, and the shears, hook and chain must therefore move together.

The claws of the guard hook are of such shape that the chain by acting against the inclined rear side of them, will lift them up and move forward without obstruction, but will be caught by the front sides of the jaws, and prevented from moving backward.

I do not propose to claim either the draft hook, the shears, or the pulley, by itself; as neither can of itself, nor can any two of them, perform the functions for which, after much thought and many experiments, I discovered that all three acting in connection, were indispensable.

Having thus described my improvement in stump extractors, what I claim therein as my invention, is—

The combination of the draft hook (R), shears (H), and pulley (N) substantally in the manner and for the purpose herein set forth.

In testimony whereof, I have hereunto subscribed my name.

W. W. WILLIS.

Witnesses:
P. H. WATSON,
F. G. DE FONTAINE.